Nov. 20, 1923.
J. A. FAGAN
1,474,929
ATTACHABLE BED AND CARRIER FOR VEHICLES
Filed Aug. 24, 1922     3 Sheets-Sheet 1
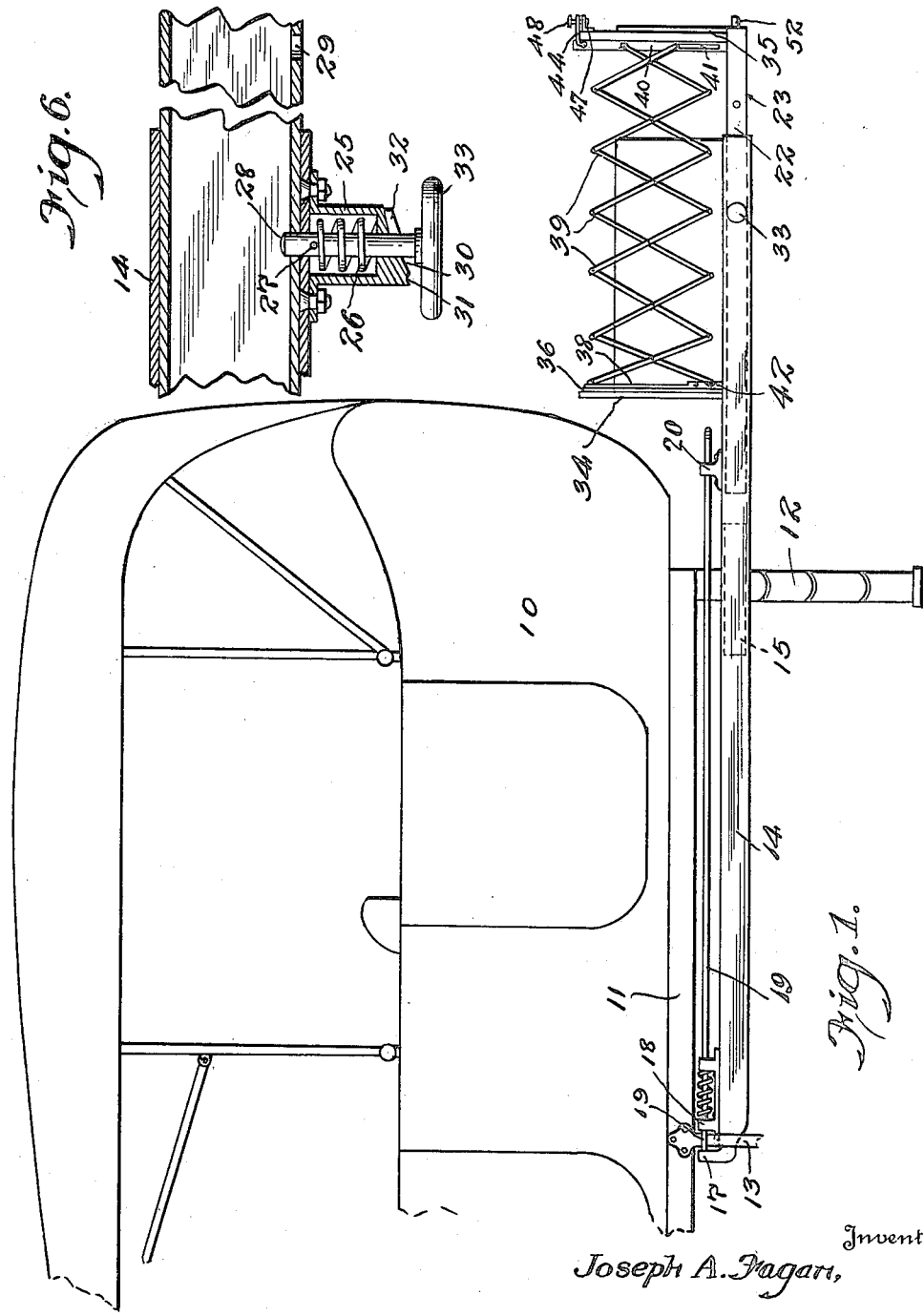
Inventor
Joseph A. Fagan,
By H. S. Woodward,
Attorney Nov. 20, 1923.                                    1,474,929
J. A. FAGAN
ATTACHABLE BED AND CARRIER FOR VEHICLES
Filed Aug. 24, 1922    3 Sheets-Sheet 2
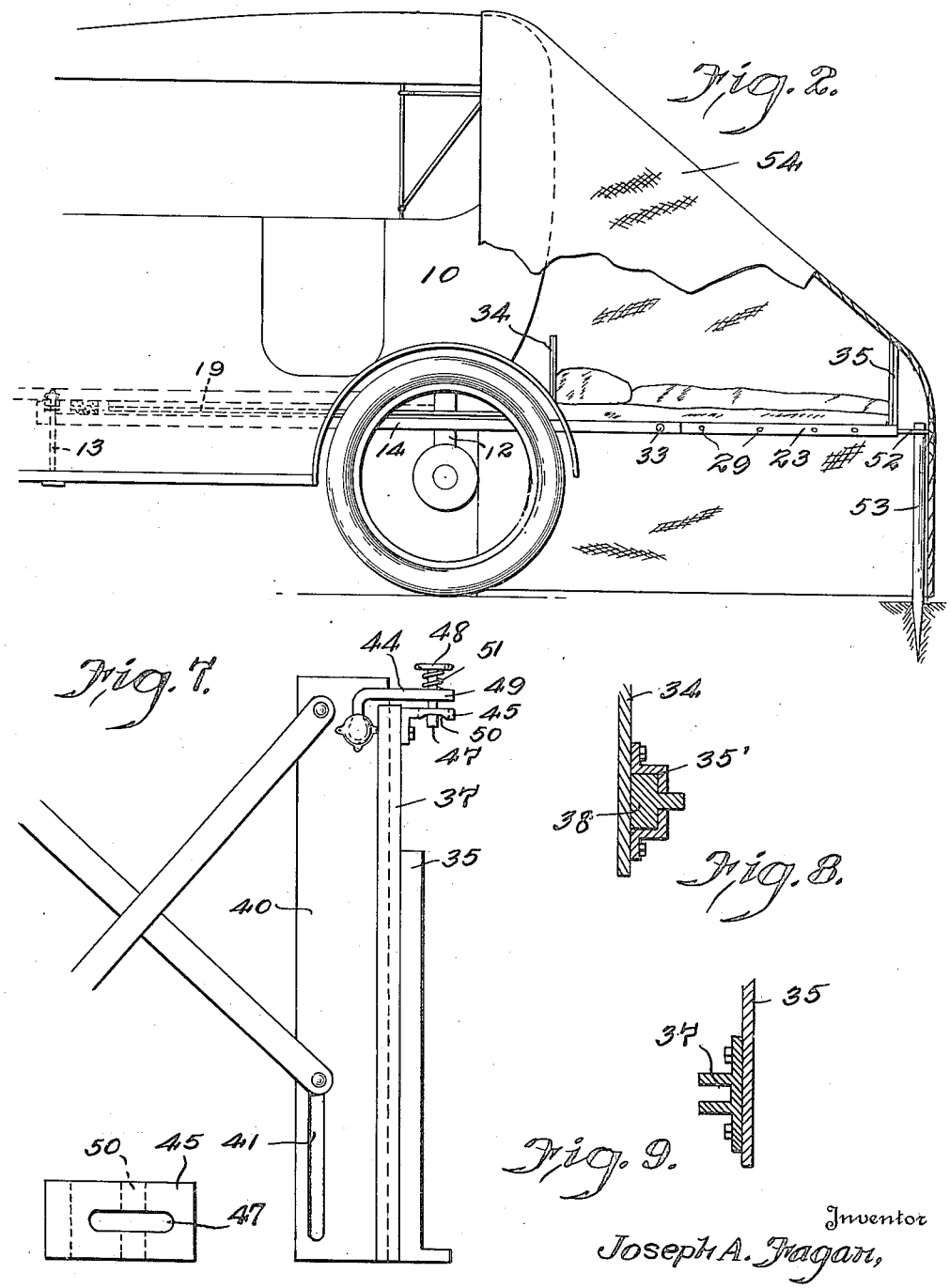
Inventor
Joseph A. Fagan,
By H. S. Woodward
Attorney Nov. 20, 1923.                                                              1,474,929
J. A. FAGAN
ATTACHABLE BED AND CARRIER FOR VEHICLES
Filed Aug. 24, 1922          3 Sheets-Sheet 3
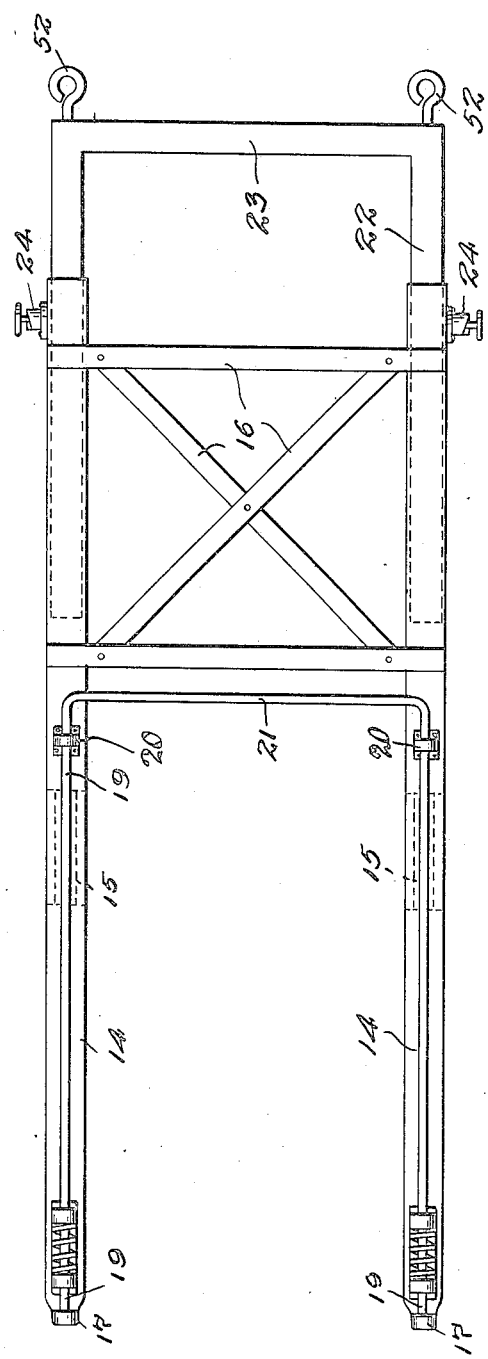
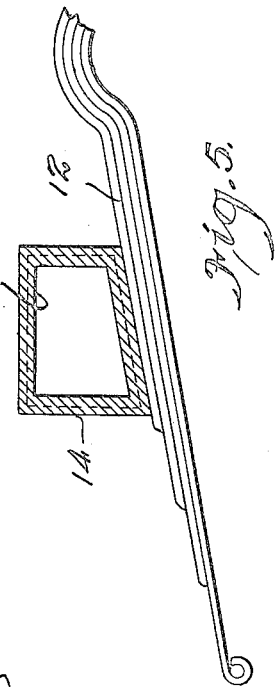
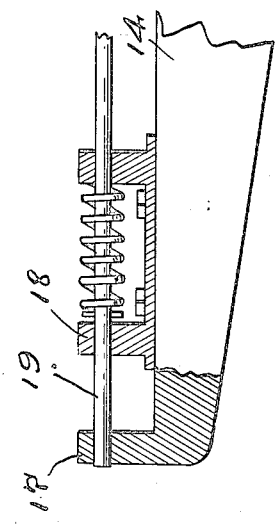
Inventor
Joseph A. Fagan,
By H. L. Woodward,
Attorney Patented Nov. 20, 1923.

1,474,929

UNITED STATES PATENT OFFICE.

JOSEPH A. FAGAN, OF AUGUSTA, KENTUCKY, ASSIGNOR OF ONE-THIRD TO WALTER SMITH, OF AUGUSTA, KENTUCKY.

ATTACHABLE BED AND CARRIER FOR VEHICLES.

Application filed August 24, 1922. Serial No. 584,161.

*To all whom it may concern:*

Be it known that I, JOSEPH A. FAGAN, a citizen of the United States, residing at Augusta, in the county of Bracken and State of Kentucky, have invented certain new and useful Improvements in Attachable Beds and Carriers for Vehicles, of which the following is a specification.

The invention has for an object to provide a quickly attachable device for carrying luggage or merchandise, on passenger automobiles of familiar type. It is an aim to provide a device of this kind which is readily adaptable to use for either commercial delivery or for use in carrying produce or small animals, as well as for use in carrying dunnage or duffle incident to a camping trip. It is a further aim to provide a device of this kind which may also be adapted to use as a bed.

It is an especially important aim of the invention to provide an attachment of this kind which may be put upon a vehicle of a well known type now largely in use, and adaptable to other forms of vehicles, without requiring the placing of permanent fixtures, and without requiring the use of tools or modification of the vehicle structure for the emplacement of my attachment.

A further important object is to provide a novel and desirable construction in the extensible element of the appliance whereby it is adapted to carry large or small loads, or may be adjusted as a bed.

Additional objects, advantages and features of invention reside in the arrangement and combination of parts involved, as illustrated in the drawings, showing one embodiment of the invention, wherein, Figure 1 is a side elevational view of my invention applied to a vehicle.

Fig. 2 is a similar view showing the device used as a camp bed.

Fig. 3 is a top plan view of the attachment.

Fig. 4 is a fragmentary side elevation of one of the side members of my attachment.

Fig. 5 is a fragmentary cross sectional view of one of the side members engaged upon a spring.

Fig. 6 is a detail sectional view of an adjusting device.

Fig. 7 is a detail of the side member.

Fig. 8 is a fragmentary cross sectional view of the side mounting at the forward end.

Fig. 9 is a detail of the back mounting.

Fig. 10 is a top view of the stationary member of the latch device.

There is illustrated a body 10 of one form of vehicle carried upon a chassis frame 11 which is supported at the rear by a transversely extending leaf spring 12, the form of which is shown in Fig. 5. At intermediate points upon the frame 11 there are running board brackets 13, these usually extending outwardly at an acute angle to the horizontal, and then downwardly. My combined bed and carrier comprises two side members 14 of similar shape, preferably formed of tubular material, which, either throughout its length, or at an intermediate point where it rests upon the spring 12 as shown in Fig. 1, is preferably formed with its lower face having an inclination adapted to rest upon the inclined top surface of the spring 12, and for a distance at this part the tube 14 is preferably reinforced in a suitable manner, as indicated in Fig. 5. Across the rear parts of the members 14, there are extended straps or other structural elements 16 adapted to connect the side members in a rigid relation and also afford support for loads or the like which may have to be carried, including diagonal elements, whereby the device will be braced.

The side members 14 are extended forwardly from the elements 16 such distance that the forward ends of the members 14 may engage beneath the brackets 13 at the sides when the members are inserted over the springs 12 and pushed forwardly until the parts 16 are located just to the rear of the body 10. The extremity of each member 14 is provided with an upturned ear 17, arranged just beyond the bracket 13 and to project thereabove, while inwardly of the ear 17 a bolt mounting 18 is provided, including two studs in which there is slidable a spring-pressed bolt 19. The bracket 18 is spaced from the ear 17 sufficiently to form a recess for the bracket, the bolt extending across this space and engaging slidably in the ear 17 with a space under the bolt sufficient to accommodate the bracket, as illustrated in Fig. 1. The bolts extend rearwardly (Fig. 3) over the members 14 a distance, being mounted slidably in small brackets 20 adjacent the rear of the body 10 and being connected by a cross bar 21, which enables operation of the bolts at both sides, simultaneously.

Engaged slidably in the rear ends of the side members 14 there are arms 22 of a U-shaped extension element 23, by which the frame of the device may be extended as desired. The arms 22 are apertured on the outer sides, as shown in Fig. 6, for engagement of a latch device 24, for securement at different points of adjustment. The latch device 24 comprises a case body 25 in the form of a hollow cylinder having a flange base secured to the side member 14, a spring 26 being confined therewithin bearing against a cross pin 27 in the latch pin 28, by which the latter is forced inwardly to engage in the aperture 29 of the arms 22. The outer end of the case 25 is formed with a cam surface 30, with a slight recess 31 at its outer part, and an arm 32 on the side of the pin 28 travels upon the cam, a knob 33 being provided on the outer end of the pin 28 turning of which will move the arm 32 upon the cam and thus retract the pin 28, until released. The bare frame work thus described and illustrated in Fig. 3, may be used for carrying trunks and the like by strapping the same thereto. It is found desirable, however, to attain the full ends of the invention, to provide a head board 34 upon the members 14 just forwardly of the cross pieces 16 before mentioned and upon the element 23 a foot board 35 is mounted, as shown. Upon the head board 34 at each side, vertical channels 35' are provided open at the upper ends as shown in Fig. 8, while upon the foot board, in corresponding positions, there are provided grooved members 37. The channels 35' are provided with overhanging sides and slidable therein is an end member 38, T-shaped in cross section, the lateral flanges of which are adapted to engage snugly in the channels 35'. Mounted upon this member, there is a lazy tong side member 39 carrying an outer end piece 40 which is adapted to set in the grooved member 37 before mentioned when the side member is extended sufficiently. The terminal element of the lazy tong member may be permanently pivoted at the upper part 38 and 40 and may be slidable at the lower part, as shown at 41 on the member 40 or adjustably pinned as shown at 42 on the member 38, as shown in Fig. 1. The top of the arm 22 at the base of the members 35 may be apertured to receive the lower end of the end member 40 of the lazy tong element and the upper end of the member 40 may be retained by means of the latch 44 shown in Fig. 7. The latch device comprises a stationary or base member L-shaped in side elevation mounted upon the rear side of the member 40 with an arm extending rearwardly therefrom which is slotted longitudinally to permit the insertion of a T-shaped head 47 of a spring pressed latch pin 48 therethrough, when the head is turned to aline with the slot and pressed downwardly therethrough. The pin 48 is carried on an arm 49 which is secured upon the member 40, and extends rearwardly therefrom and over the member 45, as clearly shown in Fig. 7. The underside of the arm 49 is transversely recessed, as at 50 so that when the head 47 is inserted through the slot of the member 45 and turned transversely, upon release of the pin 48 from manual control, the spring 51 raises the pin 48 causing the head 47 to engage in the transverse recess and prevent casual rotation of the head in such manner that it will not become accidentally disengaged.

Eye pieces 52 may be removably engaged in the rear ends of the extension element 23 at each side, when the device is to be used as a bed, and stakes or legs 53 inserted partly therethrough, extended downwardly to rest upon or be partly driven into the ground for the support of the outer end of the devices, as shown in Fig. 2. Lines may be extended from the eye pieces to the top of the vehicle and tarpaulin or other tent material fixed thereover as shown at 54 in Fig. 2, to form a shelter for the bed, or for other uses.

What is claimed:—

1. An attachable device of the character described comprising a frame including two forwardly extended members adapted to be inserted through the structure of a vehicle to rest intermediately upon a vehicle structure element, and to engage terminally under a vehicle structure element and means operable from the rear part of the device to releasably engage a vehicle structure element for retention.

2. A combined bed and load carrier comprising a frame attachable to a vehicle, an extensible outer part, and lazy-tong elements extensible therewith, and including end members transverse to the tong elements respectively and slidable mounting for the end members on respective end parts of the combined device, whereby the tong elements may be removed.

3. A device of the character described comprising a frame including side members insertable through the structure of a vehicle, to rest intermediately upon a vehicle structure element and to engage terminally beneath a transverse vehicle structure element, a recess being formed on each side member to receive such transverse element, a spring pressed bolt on each side member to engage over such transverse element, and means at the rear part of the device to operate the bolts.

In testimony whereof I have affixed my signature in presence of two witnesses.

JOSEPH A. FAGAN

Witnesses:
W. H. STEVENSON,
EARL E. HINDMAN.